3,410,895
PROCESS FOR THE PRODUCTION OF α-NAPHTHALENE SULPHONIC ACID

Ernst Graf, Neuallschwil, Basel-Land, and Alfred Rheiner, Binningen, Basel-Land Switzerland, assignors to Sandoz Ltd. (also known as Sandoz A.G.), Basel, Switzerland
No Drawing. Filed July 8, 1965, Ser. No. 470,582
Claims priority, application Switzerland, July 16, 1964, 9,334/64
3 Claims. (Cl. 260—505)

The present invention relates to a process for the production of α-naphthalene sulphonic acid and to the resulting acid.

Known processes for the production of α-naphthalene sulphonic acid involve sulphonating naphthalene with concentrated sulphuric acid or its monohydrate at temperatures below the melting point of naphthalene, i.e. below about 80° C. In order to obtain high yields it is necessary to use a considerable excess of sulphuric acid. It is further known that the sulphonation with a stoichiometric amount of sulphur trioxide at a temperautre below 140° C. gives the α-sulphonic acid and that two mols of sulphur trioxide for every mol of naphthalene must be used at these temperatures before sulphonation in the β-position also occurs. Courtot and Bonnet (C.r., 182,855, 1926) have described a laboratory experiment in which naphthalene monosulphonic acid was obtained with a yield of 88% by sulphonation of naphthalene in chloroform with sulphur trioxide at temperatures of 0–10° C.; however, since it is soluble in chloroform, a large amount of the monosulphonic acid remains dissolved so that this method would not be feasible on a technical scale. According to details published in Chemical Review 1962, page 577, it is possible to produce mainly α-naphthalene sulphonic acid by means of certain sulphur trioxide complexes, for example $SO_3$/dioxan, $SO_3$/dithiane, $SO_3$/pyridine etc. When more than 1 mol of sulphur trioxide per mol of naphthalene is used disulphonic acids are formed. For example, Muth (Houben-Weyl "Methoden der organischen Chemie," IX 502, 1955) describes a process in which 1,5-disulphonic acid with a yield of 75% results at a temperature of 20° C. on using $SO_3$ and tetrachloroethane as solvent. Up to now no technical process is known in which naphthalene is converted on a large scale to α-naphthalene sulphonic acid by means of sulphur trioxide with a high yield.

It has now been found that it is possible to obtain a high yield of anhydrous, technically pure α-naphthalene sulphonic acid by sulphonating naphthalene with sulphur trioxide in a suitable solvent and under certain conditions described in detail hereinafter.

The present invention provides a process for the production of α-naphthalene sulphonic acid, which comprises sulphonating with gaseous sulphur trioxide, at a temperature of at most 30° C., naphthalene dissolved in an organic solvent selected from tetrachloroethylene, trichloroethylene and carbon tetrachloride, the amount of sulphur trioxide being about one mol thereof for every mol of naphthalene, said sulphur trioxide being used in the form of a mixture with a gas which is inert under the reaction conditions, and recovering the resulting precipitated α-naphthalene sulphonic acid before all of the naphthalene starting material has become sulphonated, said solvent having resulted from a previous similar operation. It should be noted that the α-naphthalene sulphonic acid must be removed from the solvent used in the process of the invention to avoid the formation of disulphonic acid; furthermore, separation of the α-naphthalene sulphonic acid from the solvent to be used in the process of the invention must be effected before the entire naphthalene starting material has become sulphonated.

The preferred solvent is tetrachloroethylene. The preferred reaction temperature is from 0 to 30° C. inclusive. α-Naphthalene sulphonic acid produced by the process of the invention may be separated by filtration from the solvent surprisingly well and, under favourable conditions, can be obtained with a yield of 88% and over of the theoretical yield.

The process of the present invention may be effected, for example, as follows:

Naphthalene is dissolved in a sufficient amount of one of the three above mentioned chlorinated aliphatic hydrocarbons and gaseous sulphur trioxide diluted by means of an inert gas is introduced into the solution while stirring at a temperature of 0–30° C. Shortly after the introduction of the dilute sulphur trioxide has commenced monosulphonic acid begins to precipitate in greyreddish, sandy form. After about 1 mol of sulphur trioxide has been taken up, stirring is continued for some time at the same temperature in order to complete the reaction. The precipitated sulphonic acid is then separated from most of the solvent by filtering or centrifugation. It is freed from solvent still adhering to it in a vacuum and is then present in the form of a granular, grey mass which is free from water of crystallization. It contains only small quantities of unsulphonated naphthalene and small quantities of by-products. Removal of unreacted naphthalene may be effected, for example, in known manner by extraction with the solvent already used or another one.

As mentioned above, the sulphur trioxide is used in the form of a gas mixture, i.e. the sulphur trioxide is diluted with a gas which is inert under the reaction conditions (for example nitrogen, air, etc.). The sulphur trioxide concentration in this gas may vary within wide ranges, but suitably this will be about 5–20% by volume of the $SO_3$ gas. When the starting material is converter gas or gas mixture which is obtained by the oxidation of sulphur with air to $SO_2$ and then to $SO_3$, further dilution thereof with an inert gas is unnecessary. On using such technically available mixtures the process of the invention is particularly economical. The amount of sulphur trioxide to be used is only slightly higher than the stoichiometric amount of 1 mol of sulphur trioxide per mol of naphthalene; the amount of the excess to be used is necessary due to inevitable losses which depend on the apparatus and reaction conditions used, e.g. stirring and dispersion effect, shape of the reactor etc. In general, an excess greater than about 5–10% should not be used and the amount of anhydride should be chosen in such a way that the naphthalene is not completely sulphonated.

The reaction temperature must not exceed 30° C., but otherwise may vary within certain limits. In order to keep the vapour pressure of the solvent as low as possible, temperatures of from about 0 to 20° C. are preferred; these temperatures are favourable also because only a small amount of by-products (sulphones) result thereby.

In the exemplified process the yields amount to about 90% of the theoretical yield in sulphonic acid free from solvent. A large amount of unsulphonated naphthalene remaining in the solvent may be used by re-use of the solvent immediately so that on using the solvent several times it is possible to obtain yields about 90%, based on the amount of naphthalene used.

The process of the invention may be carried out as a continuous process.

The following examples illustrate the invention without, however, limiting it.

EXAMPLE 1

128 g. of naphthalene are dissolved in 800 g. of tetrachloroethylene. A stream totalling 85 g. of sulphur trioxide in nitrogen (6 volume percent $SO_3$) is introduced uniformly during one hour at a reaction temperature of 15° C. After the introduction is complete, stirring is continued for a further half hour at 15° C. It is possible to filter off almost quantitatively the sulphonic acid which precipitates in reddish-grey form, and to free it of solvent adhering to it in a vacuum. The solvent may be used for the next batch without further treatment. The yield in crude α-naphthalene sulphonic acid amounts to about 90% of the theoretical yield.

EXAMPLE 2

The procedure is as stated in Example 1, but during the sulphonation operation part of the reaction liquid is led through a centrifuge or filtration device in which the precipitated sulphonic acid is removed and the liquid free of sulphonic acid is led back into the sulphonation device, naphthalene being added continuously when necessary, insofar as it is desired to conduct the operation wholly continuously.

In the above two examples the α-naphthalene sulphonic acid was removed from the solvent before re-using the latter and this separation was effected before all of the naphthalene had become sulphonated.

We claim:

1. A process for the production of α-naphthalene sulphonic acid, which comprises sulphonating with gaseous sulphur trioxide, at a temperature of at most 30° C., naphthalene dissolved in an organic solvent selected from tetrachloroethylene and trichloroethylene, the amount of sulphur trioxide being about one mol thereof for every mol of naphthalene, said sulphur trioxide being used in the form of a mixture with a gas which is inert under the reaction conditions and recovering the resulting precipitated α-naphthalene sulphonic acid before all of the naphthalene starting material has become sulphonated.

2. A process for the production of α-naphthalene sulphonic acid, which comprises continuously sulphonating with gaseous sulphur trioxide, at a temperature of at most 30° C., naphthalene dissolved in an organic solvent selected from tetrachloroethylene and trichloroethylene, the amount of sulphur trioxide being about one mol thereof for every mol of naphthalene, said sulphur trioxide being used in the form of a mixture with a gas which is inert under the reaction conditions and continuously recovering the resulting precipitated α-naphthalene sulphonic acid before all of the naphthalene starting material has become sulphonated, said solvent being continuously recycled.

3. A process for the production of α-naphthalene sulfonic acid, which comprises sulphonating with gaseous sulphur trioxide at a temperature between 0° and 30° C., naphthalene dissolved in tetrachloroethylene, the amount of sulphur trioxide being about one mol thereof for each mol of naphthalene, said sulphur trioxide being used in a gaseous mixture with a gas which is inert under the reaction conditions, said gaseous mixture having 5 to 20% by volume of sulphur trioxide, and recovering the resulting precipitated α-naphthalene sulphonic acid before all of the naphthalene starting material has become sulphonated.

References Cited

UNITED STATES PATENTS

| 1,332,203 | 3/1920 | Dennis | 260—505 |
| 2,025,197 | 12/1935 | Cotton | 260—505 |
| 2,807,642 | 9/1957 | Bloch et al. | 260—505 |

OTHER REFERENCES

Courtot et al.: Compt. Rend. 182 (1926), pp. 855–7.

LEON ZITVER, *Primary Examiner.*

H. ROBERTS, *Assistant Examiner.*